United States Patent [19]

Boughton

[11] 4,080,003
[45] Mar. 21, 1978

[54] WHEELED VEHICLE AXLE ASSEMBLY

[75] Inventor: Robert G. Boughton, Palos Hills, Ill.

[73] Assignee: Motor Wheel Corporation, Lansing, Mich.

[21] Appl. No.: 735,841

[22] Filed: Oct. 26, 1976

[51] Int. Cl.² ............................................. B60B 35/00
[52] U.S. Cl. .................................. 301/125; 403/267; 301/132
[58] Field of Search .................... 301/124 R, 125, 131, 301/132, 134, 135; 295/36 R, 41, 42; 228/135, 138, 60, 151, 153; 285/284, 286; 403/267, 270–272; 188/18 R

[56] References Cited
U.S. PATENT DOCUMENTS 1,488,128  3/1924  Macdonald ........................ 403/267
2,634,169  4/1953  Martin .................................. 301/132

FOREIGN PATENT DOCUMENTS 260,474  3/1949  Switzerland ....................... 295/36 R Primary Examiner—Robert B. Reeves
Assistant Examiner—H. Grant Skaggs
Attorney, Agent, or Firm—Barnes, Kisselle, Raisch & Choate

[57] ABSTRACT

An axle assembly having an axle tube, a transversely extending adapter plate adjacent an end of the tube, and a spindle projecting generally axially through the adapter plate. The adapter plate and spindle each have circumferentially spaced apart interdigitating fingers fixed thereto and each bearing on and extending generally radially across the end of the tube with the fingers of both the spindle and the adapter plate fixed to the tube by a weld which preferably extends circumferentially continuously around the outer periphery of the tube adjacent the end thereof.

12 Claims, 3 Drawing Figures

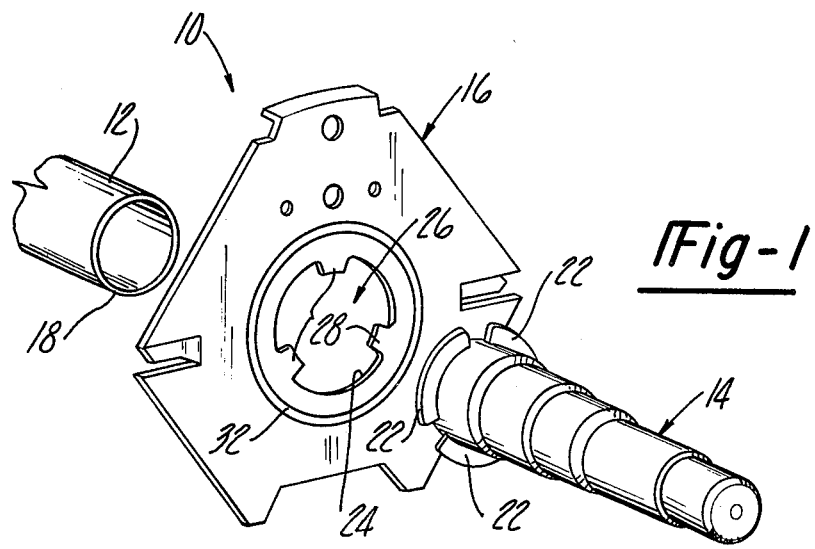
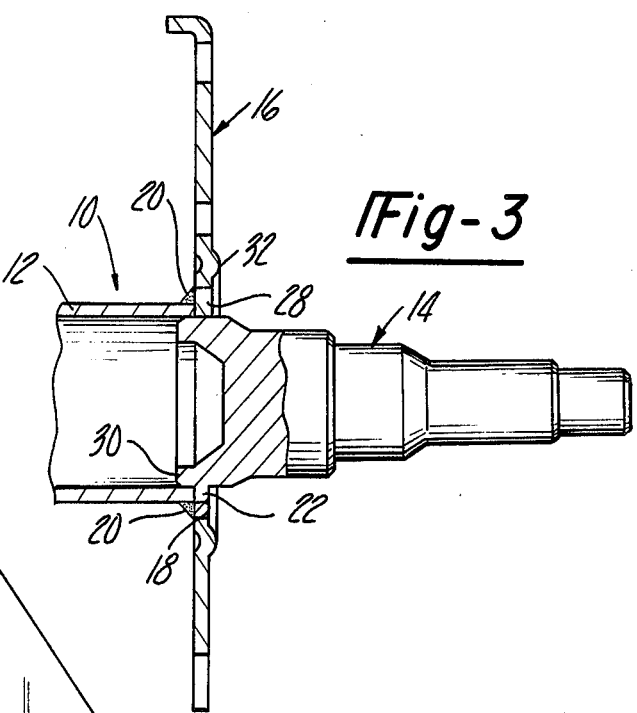
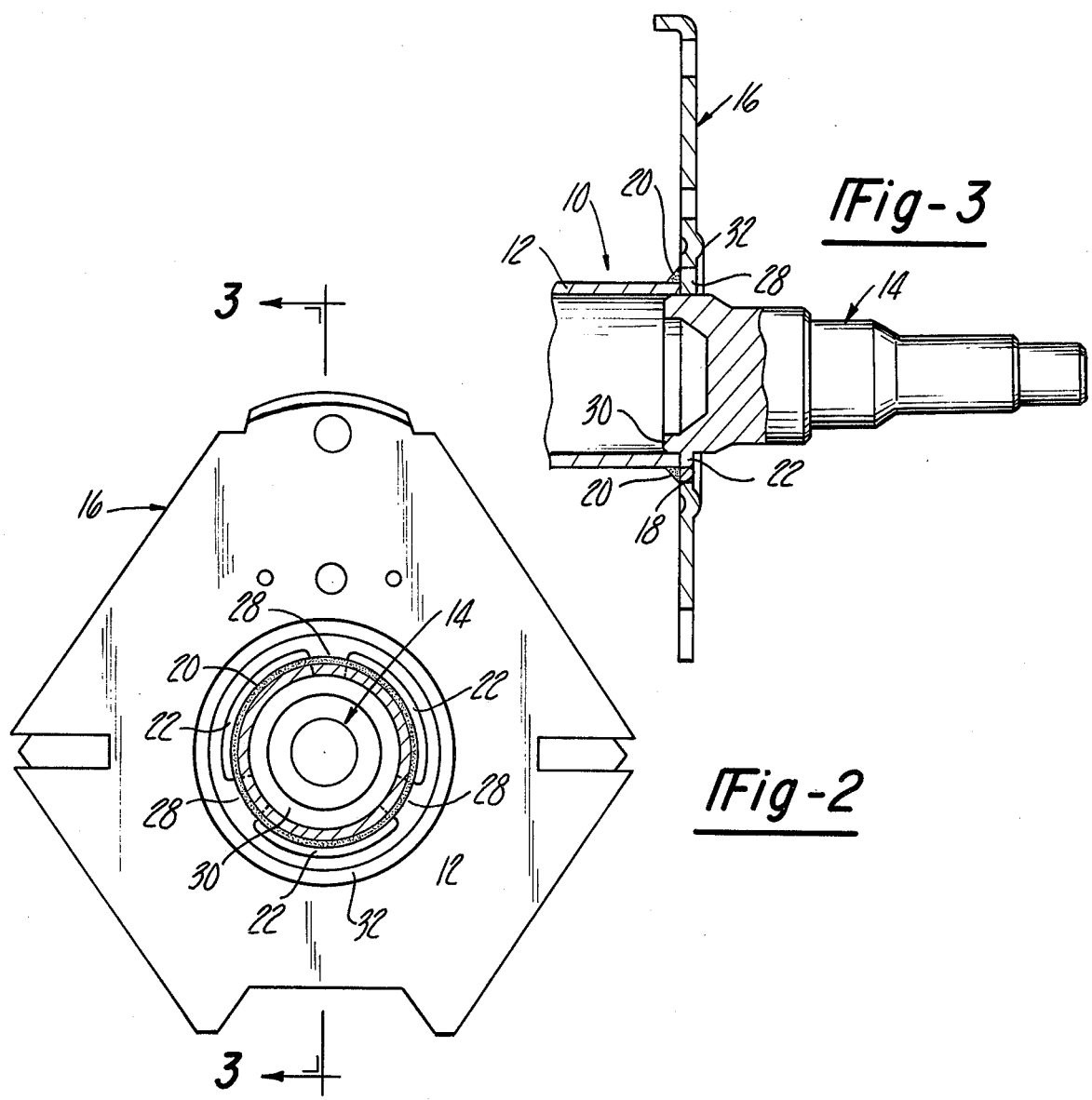

WHEELED VEHICLE AXLE ASSEMBLY

This invention relates to an axle assembly and more particularly to an axle assembly for a wheeled vehicle such as a house trailer, travel trailer, and the like.

A previously known axle assembly for travel trailers has a steel axle tube with a steel spindle at each end for receiving a brake drum thereon. A steel adapter plate extends generally transversely of each spindle for mounting a pair of brake shoes and actuating mechanism in operative relationship to the brake drum. Each spindle extends through a cylindrical hole in its associated adapter plate and has a circumferentially continuous flange interposed between an end of the tube and the adapter plate so that one face of the flange bears on a face of the adapter plate and the other face of the flange bears on the end of the tube. Both the spindle and the adapter plate are permanently fixed to the tube by a weld which extends generally circumferentially around and simultaneously overlaps and engages the outer periphery of the tube adjacent the end of the tube, the outer periphery of the flange, and an adjacent portion of the adapter plate.

Objects, features, and advantages of this invention are to provide an axle assembly which has increased load and torque carrying capacity, is easier and requires less time and material to weld the adapter plate and spindle to the tube, has welds which are easier to inspect and less likely to fail in service, has less warping of the adapter plate due to welding of the plate to the tube which results in a more accurate mounting of brake shoes in relation to the brake track surface of a brake drum, and is of economical manufacture and assembly.

These and other objects, features, and advantages of this invention will be apparent from the following detailed description, appended claims, and accompanying drawing in which:

FIG. 1 is a fragmentary exploded isometric view of the axle tube, adapter plate, and spindle of an axle assembly embodying this invention;

FIG. 2 is an end view partially in section of the component parts of FIG. 1 in assembly; and FIG. 3 is a sectional view on line 3—3 of FIG. 2.

Referring in more detail to the drawing, FIGS. 1 through 3 illustrate an axle assembly 10 for a wheeled vehicle having brakes such as a travel trailer. Axle assembly 10 is made of a metal such as steel and has an axle tube 12 with a spindle 14 and an adapter plate 16 fixed on each end 18 of the tube by a weld 20. In use, axle assembly 10 is mounted on a vehicle, a brake drum and wheel are journalled for rotation with respect to axle tube 12 on each spindle 14, and a pair of brake shoes and suitable actuator mechanism are mounted on each adapter plate 16 for generally radially outward movement of the brake shoes into sliding frictional engagement with the brake drum to apply the brakes of the vehicle when the actuator mechanism is energized.

In accordance with this invention, spindle 14 has circumferentially spaced flange segments or fingers 22 fixed thereon which in assembly are received in complimentary pockets 24 of a central opening 26 of adapter plate 16 in interdigital relationship with circumferentially spaced tabs or fingers 28 of adapter plate 16. Each finger 22 and 28 bears on and extends generally radially across and radially outwardly beyond one of the ends 18 of tube 12 and is fixed to the tube by a weld 20 which can be intermittent but as shown in FIG. 2, is preferably continuous and extends around the entire outer periphery of tube 12. When axle assembly 10 is in use, the magnitude of the maximum load to which each spindle 14 is subjected is much greater than the load to which each adapter plate 16 is subjected when the brakes are applied. Hence, it is believed to be preferable, as shown in FIGS. 1 and 3, for the arcuate or circumferential extent secured to the tube by weld 20 of fingers 22 of the spindle to be at least twice and preferably in the range of three to five times greater than the arcuate or circumferential extent secured to tube 12 by weld 20 of fingers 28 of the adapter plate. To further increase the load carrying capability of the connection of the spindle 14 to the tube and to facilitate locating the spindle and adapter plate on the tube, spindle 14 preferably has a generally cylindrical rib portion 30 providing a pilot telescopically and slideably receivable within tube 12.

Preferably fingers 28 of adapter plate 16 are constructed and arranged so that in assembly they bear on the edges of fingers 22 when received therebetween so that the torque on the plate produced by application of the brake is resisted by and transmitted to the tube through the fingers 22 of the flange as well as the fingers 28 of the adapter plate. To decrease warping or distortion of adapter plate 16 resulting from welding the fingers of the adapter plate and the spindle to axle tube 12, the adapter plate 16 has a circumferentially continuous rib 32 therein which is adjacent to and radially outward of both the weld 20 and all of the fingers 22 and 28. Rib 32 is believed to provide both a sink for heat produced in making weld 20 and to rigidify plate 16, both of which are believed to decrease the warping or distortion of the plate. Since the brake shoe assembly is mounted on plate 16, such warping or distortion of the plate results in misalignment of the brake shoes with the brake drum so that the surface of the brake shoes is not parallel with the brake track surface of the brake drum which decreases the efficiency and performance of the brakes.

In this invention, providing fingers on both the spindle and the adapter plate, which fingers bear directly on the end of the tube and are each fixed directly thereto by a weld, provides a construction and arrangement which decreases the time, amount of material, and energy or heat required to satisfactorily weld both the spindle and the adapter plate to the axle tube. This construction and arrangement of interdigital fingers also results in a weld of improved quality which can be more easily inspected and when made by mass production methods is believed to have significantly fewer defective welds. This construction and arrangement of interdigital fingers each bearing on an end of the tube when fixed thereto by a continuous weld, provides a connection of the spindle and adapter plate to the tube which has a greater maximum torque and load carrying capacity, results in less distortion of the adapter plate, and is of economical manufacture and assembly.

I claim:

1. An axle assembly for a wheeled vehicle comprising a metallic axle tube, a metallic adapter plate adjacent an end of said tube and extending generally transversely of the axis of said tube, a metallic spindle adjacent said end of said tube and projecting generally axially from said adapter plate, said adapter plate having at least two circumferentially spaced apart metallic fingers fixed thereto and each bearing on and extending generally radially across and radially beyond in at least one direction said end of said tube, said spindle having at least two circumferentially spaced apart metallic fingers fixed thereto and each bearing on and extending generally radially across and radially beyond in at least said one direction said end of said tube and interdigitating with said fingers of said adapter plate, and a weld fixing each of said fingers of both said spindle and said adapter plate to said tube adjacent said end thereof.

2. The axle assembly of claim 1 wherein each of said fingers extends radially outwardly beyond said end of said tube and said weld comprises a circumferential weld extending around the outer periphery of said tube adjacent said end thereof.

3. The axle assembly of claim 1 wherein the interdigitating fingers of said adapter plate and said spindle bear on each other such that said fingers of said spindle resist any torque tending to rotate said adapter plate in at least one direction about the axis of said spindle.

4. The axle assembly of claim 1 wherein said spindle has a pilot extending generally axially beyond said fingers thereof and telescopically slideably received within said tube adjacent said end thereof.

5. The axle assembly of claim 1 wherein the generally circumferential extent bearing on said end of said tube of said fingers of said spindle is greater than the circumferential extent bearing on said end of said tube of said fingers of said adapter plate.

6. The axle assembly of claim 5 wherein said weld extends generally circumferentially adjacent the entire portion bearing on said end of said tube of each finger of said adapter plate and each finger of said spindle.

7. The axle assembly of claim 1 wherein the circumferential extent bearing on said end of said tube of said fingers of said spindle is at least two times as great as the circumferential extent bearing on said end of said tube of said fingers of said adapter plate.

8. The axle assembly of claim 7 wherein said weld extends generally circumferentially adjacent the entire portion bearing on said end of said tube of each finger of said adapter plate and each finger of said spindle.

9. The axle assembly of claim 1 wherein the generally circumferential extent bearing on said end of said tube of said fingers of said spindle is in the range of two to five times greater than the generally circumferential extent bearing on said end of said tube of said fingers of said adapter plate.

10. The axle assembly of claim 9 wherein each of said fingers includes a portion disposed radially outwardly of said one end of said tube and said weld comprises a circumferential weld extending around the outer periphery of said tube adjacent said end thereof.

11. The axle assembly of claim 1 wherein said adapter plate also has a rib thereon extending generally circumferentially around said tube and located adjacent said weld and radially outwardly of said fingers.

12. The axle assembly of claim 11 wherein each of said fingers includes a portion disposed radially outwardly of said end of said tube, said weld extends continuously around the outer periphery of said tube adjacent said end thereof, and the generally circumferential extent bearing on said end of said tube of said fingers of said spindle is in the range of two to five times greater than the generally circumferential extent bearing on said end of said tube of said fingers of said adapter plate.

* * * * *